United States Patent
Li et al.

(10) Patent No.: US 7,146,479 B2
(45) Date of Patent: Dec. 5, 2006

(54) METHOD AND APPARATUS OF STORAGE ALLOCATION/DE-ALLOCATION IN OBJECT-ORIENTED PROGRAMMING ENVIRONMENT

(75) Inventors: Richard Chi Leung Li, Hong Kong (HK); Anthony Shi Sheung Fong, Hong Kong (HK)

(73) Assignee: City U Research Limited, Kowloon (HK)

(*) Notice: Subject to any disclaimer, the term of this patent is extended or adjusted under 35 U.S.C. 154(b) by 341 days.

(21) Appl. No.: 10/198,947

(22) Filed: Jul. 18, 2002

(65) Prior Publication Data
US 2003/0028739 A1   Feb. 6, 2003

Related U.S. Application Data

(60) Provisional application No. 60/306,480, filed on Jul. 18, 2001.

(51) Int. Cl.
*G06F 12/00* (2006.01)

(52) U.S. Cl. ............... 711/170; 711/156; 711/173; 711/200; 707/205; 718/104

(58) Field of Classification Search ............ 711/170, 711/173, 156, 200; 718/104; 707/205
See application file for complete search history.

(56) References Cited

U.S. PATENT DOCUMENTS

| | | | | |
|---|---|---|---|---|
| 5,247,634 A * | 9/1993 | Cline et al. | ........... | 707/205 |
| 5,561,786 A * | 10/1996 | Morse | ........... | 711/170 |
| 5,784,698 A * | 7/1998 | Brady et al. | ........... | 711/171 |
| 5,784,699 A * | 7/1998 | McMahon et al. | ........... | 711/171 |
| 5,802,341 A * | 9/1998 | Kline et al. | ........... | 711/209 |
| 5,930,829 A | 7/1999 | Little | | |
| 6,105,040 A | 8/2000 | Agesen | | |
| 6,209,066 B1 | 3/2001 | Holzle et al. | | |
| 6,219,772 B1 | 4/2001 | Gadangi et al. | | |
| 6,249,852 B1 * | 6/2001 | Benayon et al. | ........... | 711/170 |
| 6,295,594 B1 | 9/2001 | Meier | | |
| 6,427,195 B1 * | 7/2002 | McGowen et al. | ........... | 711/153 |
| 6,539,464 B1 * | 3/2003 | Getov | ........... | 711/170 |
| 6,817,011 B1 * | 11/2004 | Reynolds | ........... | 717/130 |
| 2002/0120744 A1 * | 8/2002 | Chellis et al. | ........... | 709/226 |

FOREIGN PATENT DOCUMENTS

| | | |
|---|---|---|
| WO | WO 99/35548 | 7/1999 |
| WO | WO 02/48864 A2 | 6/2002 |

OTHER PUBLICATIONS

Calder et al. (1995) "Quantifying Behavioral Differences Between C and C++ Programs," Technical Report CU-CS-698-95, Department of Computer Science, University of Colorado, Boulder, CO, Jan. 1995.

Cam et al. (1999) "A high-performance hardware-efficient memory allocation technique and design". *International Conference on Computer Design, 1999.* (ICCD '99), pp. 274-276. IEEE Computer Society Press, Oct. 1999.

(Continued)

*Primary Examiner*—Stephen C. Elmore
(74) *Attorney, Agent, or Firm*—Stephen J. LeBlanc; Quine Intellectual Property Law Group, P.C.

(57) ABSTRACT

Methods and/or systems and/or apparatus for improved memory management include different allocation and deallocation strategies for various sizes of objects needing memory allocation during runtime.

19 Claims, 8 Drawing Sheets

OTHER PUBLICATIONS

Chang and Gehringer (1996) "A high performance memory allocator for object-oriented systems". *IEEE Transactions on Computers*, vol. 45, issue 3, pp. 357-366. IEEE Computer Society Press, Mar. 1996.

Chang et al. (1999) "Measuring dynamic memory invocations in object-oriented programs". *IEEE International Computing and Communications Conference Performance 1999*, pp. 268-274. IEEE Computer Society Press, Feb. 1999.

Chang et al. (2000) "A high-performance memory allocator for memory intensive applications." High Performance Computing in the Asia-Pacific Region, 2000. Proceedings. The Fourth International Conference Exhibition, May 14-17, vol. 1. pp. 6-12.

Chang et al. (2000) "Hardware support for concurrent garbage collection in SMP systems." High Performance Computing in the Asia-Pacific Region, 2000. Proceedings. The Fourth International Conference Exhibition, May 14-17, vol. 1. pp. 513-517.

Detlefs eta l. (1994) "Memory allocation costs in large C and C++ programs.". *Software—Practice and Experience*, pp. 527-542, Jun. 1994.

Lee et al. (2000) "Evaluation of a high-performance object reuse dynamic memory allocation policy for C++ programs." Proceeding of the Fourth High Performance Computing in the Asia-Pacific Region. May 14-17. vol. 1; pp. 386-391.

Li et al. (2001) "Dynamic Memory Allocation Behavior in Java Programs". *Proceedings of the ISCA 16th International Conference in Computers and Their Applications, 2001.* (CATA- Mar. 30, 2001), pp. 362-365. The International Society for Computers and Their Applications—ISCA.

Nilsen et al. (1995) "The real-time behavior of dynamic memory Management in C++." Real-Time Technology and Applications Symposium, 1995. Proceedings May 15-17. pp. 142-153.

Rezaei & Kavi (2000) "A New Implementation Technique for Memory Management." Proceedings of the IEEE 2000 SoutheastCon, Nashville, TN Apr. 2000. pp. 332-339.

Srisa-An et al. (1999) "A hardware implementation of realloc function." IEEE Computer Society Workshop on VLSI '99. Apr. 8-9. pp. 106-111.

Srisa-An et al. (2000) "Scalable hardware-algorithm for mark-sweep garbage collection." Proceedings of the 26$^{th}$ Euromicro Conference, Sep. 5-7, vol. 1. pp. 274-281.

Vogt (1990) "A buffer-based method for storage allocation in an object-oriented system." IEEE Transactions on Computers. Mar. 1990. vol. 39, Issue 3. pp. 375-383.

\* cited by examiner

Size (Units)
8  00⟦10⟧00
4  00⟦01⟧00
3  0000⟦11⟧
2  0000⟦10⟧
1  0000⟦01⟧

Size (Units)

8 00|10|00
4 00|01|00
3 0000|11|
2 0000|10|
1 0000|01|

Memory Address

| Region Address | Region Offset |
|---|---|

Region Offset

| Unit Address | Unit Offset |
|---|---|

Block Reference

| Size Info. | Memory Address |
|---|---|

FIGURE 11
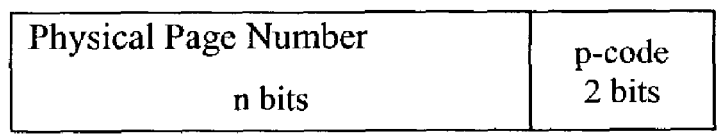
FIGURE 12
| p-code | Valid | Modified | Referenced |
|--------|-------|----------|------------|
| 00 | 0 | d | d |
| 01 | 1 | 0 | 0 |
| 10 | 1 | 0 | 1 |
| 11 | 1 | 1 | 1 |
FIGURE 13

| t bits | 2 bits |
|---|---|
| Tag | p-code |

| 46 bits | 2 bits |
|---|---|
| Tag | p-code |

METHOD AND APPARATUS OF STORAGE ALLOCATION/DE-ALLOCATION IN OBJECT-ORIENTED PROGRAMMING ENVIRONMENT

CROSS REFERENCE TO RELATED APPLICATIONS

This application claims benefit of priority from provisional application No. 60/306,480, filed on Jul. 18, 2001.

The above referenced documents and application and all documents referenced therein are incorporated in by reference for all purposes.

COPYRIGHT NOTICE

Pursuant to 37 C.F.R. 1.71(e), Applicants note that a portion of this disclosure contains material that is subject to and for which is claimed copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

The present invention relates to a method and/or system and/or apparatus for dynamic memory allocation and de-allocation. In specific embodiments, the invention involves a method and/or system and/or apparatus for memory allocation and de-allocation adapted for object oriented run-time environments, though other applications will be apparent from the teachings herein. In further embodiments, the invention involves one or more methods that may be implemented on a data handling device or system, such as a computer or other information enabled device. In further embodiments, the invention involves methods and/or systems and/or apparatus for more efficient memory handling in executable environments designed for use and/or distribution over a communication network, such as, for example, Java.

BACKGROUND OF THE INVENTION

The discussion of any work, publications, sales, or activity anywhere in this submission, including in any documents submitted with this application, shall not be taken as an admission that any such work constitutes prior art. The discussion of any activity, work, or publication herein is not an admission that such activity, work, or publication existed or was known in any particular jurisdiction.

Increasingly, object-oriented programming is widely chosen by software developers over traditional data/procedure paradigms. Object-oriented programming's success is partly based on its attractive features such as encapsulation, dynamic binding, inheritance and polymorphism. These features facilitate code reuse and code sharing and reduce the dependencies between different software modules, allowing developers to rapidly and iteratively prototype software and produce more reliable and maintainable software products.

Among a variety of object-oriented languages, Java has become popular in recent years because it is widely used for Internet applications. Java was designed to deliver powerful features in addition to its object-oriented programming approach. Such features include security, distributed computing, and platform independence. However, similar to other object-oriented languages, Java suffers from poor performance and typically Java applications will execute more slowly that an application written in, for example, C; sometimes by a factor of 10 or more.

One important cause of this performance deficiency is the heavy use of dynamic memory allocations and de-allocations in object-orientated programming. A memory allocation is invoked when creating a new object or array; while a memory de-allocation is invoked when garbage collecting an object or array. Studies as described in [1] and [2] indicate that a C++ program performs an order of magnitude more memory allocations than a comparable program written in C. For Java programs, the situation is even worse. For example, a simple Java Applet can generate about 600K memory allocations during execution of one game [6].

To improve the overall performance of object-oriented program execution, some investigations have been conducted to develop faster and more efficient memory allocators/de-allocators using both software and hardware. Generally software approaches provide a better utilization of memory, but suffer from slower speed as the memory management process must executes in parallel with application processes. Hardware approaches can yield better speed, but suffer from memory fragmentation as hardware generally cannot be as intelligent as software. Chang [4] and Cam [5] have discussed hardware methods that attempt to improve the performance of object-oriented memory management.

A method proposed by Chang is a modified buddy system [4]. It uses an or-gate tree combined with an and-gate tree with a structure roughly as shown in FIG. 1 for handling memory allocation and de-allocation requests in hardware. The free/used information of each unit of memory is recorded in a bit-vector. The or-gate tree is used to locate a free block and the and-gate tree is used to generate the address of the free block. It incorporates a "bit-flipper" to mark the bit-vector for used units and returns the unused portions of the block to available storage. This approach is simple and effective, but still suffers from a certain amount of fragmentation, as some free units may never be detected in the or-gate tree for some reallocation requests.

Cam utilizes the basic idea of Chang's suggestion and proposes another structure to handle the problem as shown in FIG. 2. This structure provides less fragmentation than Chang's method, but it requires much more logic gates to implement.

Both methods can do memory allocation and de-allocation requests in a single-cycle, but they can only detect free blocks with sizes in the power of 2. In addition, the trees will become too complex to implement if the total number of memory units is large. For example, if the basic unit for allocation is 16 bytes and the total memory is 128 MB, the size of the bit-vector is 8M bits. To implement such a system using Chang's design requires a tree with $(2^{8M})/2$ nodes. If Cam's design is applied, even more nodes are needed. It is impractical to implement such a design in a chip when the number of nodes is so large.

To overcome this problem, larger units may be used to reduce the total number of blocks, but this will lead to greater internal fragmentation. Another approach is to partition the memory into many regions so that the hardware tree is used for managing only one region and the operating system is responsible to switch the active region for the hardware to work on from time to time. This method ruins the performance of the hardware approaches, as much software overhead is required in augmenting the hardware.

Other References

Various strategies have been discussed for memory allocations, among them those discussed in the below indicated patents and other publications, some of which also provide general background information related to the present discussion.

[1] David Detlefs, Al Dosser, and Bejamin Zorn. "Memory allocation costs in large C and C++ programs.". *Software—Practice and Experience*, pp. 527–542, June 1994.

[2] Brad Calder, dirk Grunwald, and Benjamin Zorn, *Quantifying Behavioral Differences Between C and C++ Programs*, Technical Report CU-CS-698–95, Department of Computer Science, University of Colorado, Boulder, Colo., January 1995.

[3] M. Chang, Woo Hyong Lee, and Y. Hasan. "Measuring dynamic memory invocations in object-oriented programs". *IEEE International Computing and Communications Conference Performance* 1999, pp. 268–274. IEEE Computer Society Press, Feb 1999.

[4] J. M. Chang and E. F. Gehringer. "A high performance memory allocator for object-oriented systems". *IEEE Transactions on Computers*, volume 45, issue 3, pp. 357–366. IEEE Computer Society Press, March 1996.

[5] H. Cam, M. Abd-El-Barr, and S. M. Sait. "A high-performance hardware-efficient memory allocation technique and design". *International Conference on Computer Design*, 1999. (ICCD '99), pp. 274–276. IEEE Computer Society Press, October 1999.

[6] Richard C. L. Li, Anthony S. Fong, H. W. Chun, and C. H. Tam. "Dynamic Memory Allocation Behavior in Java Programs". *Proceedings of the ISCA 16th International Conference in Computers and Their Applications*, 2001. (CATA-2001), pp 362–365. The International Society for Computers and Their Applications—ISCA.

U.S. Patent Documents

[7] 5,930,829 July 1999 Frank S. Little
[8] 6,219,772 April 2001 Ashok Kumar Gadangi
[9] 6,295,594 September 2001 Stephan G. Meier

DESCRIPTION OF SPECIFIC EMBODIMENTS

Glossary

Before describing the present invention in detail, it is to be understood that this invention is not limited to particular compositions or systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content and context clearly dictates otherwise. Thus, for example, reference to "a device" includes a combination of two or more such devices, and the like.

Unless defined otherwise, technical and scientific terms used herein have meanings as commonly understood by one of ordinary skill in the art to which the invention pertains. Although any methods and materials similar or equivalent to those described herein can be used in practice or for testing of the present invention, the preferred materials and methods are described herein.

In describing and claiming the present invention, the terms storage, storage elements, storage devices, and memory are generally used interchangeably.

SUMMARY OF THE INVENTION

The present invention according to specific embodiments addresses one or more of the following characteristics of memory allocation and de-allocation behavior of object oriented executable routines, such as, for example routines written in Java, C#, C++, etc.

The first characteristic addressed according to specific embodiments of the present invention is that dynamic memory allocations are heavily used by the runtime environments of various object oriented systems, such as Java. A simple Othello game applet, for example, generates about 600K memory allocation requests during play of one game.

The second characteristic addressed according to specific embodiments of the present invention is that memory allocation requests are often for small block sizes. Some studies have indicated that almost 90% of the total allocation requests are for block sizes less than 256 bytes and close to 100% of the total allocations are for block sizes less than 1,024 bytes.

The third characteristic addressed according to specific embodiments of the present invention is that most of the blocks allocated have short lifetimes, and block of small size generally have a higher probability of having a short lifetime. This means that a large percentage of memory allocation requests in many situations are generated by transient and small objects/arrays.

From these characteristics, it has been determined that the memory allocation and de-allocation behavior of object oriented programs generally have a locality, a characteristic discussed in computer science regarding memory accesses in typical logic execution. For example, in some discussions, locality is understood as the closeness/neighborhood of a referenced memory address to earlier memory reference addresses. Computing systems generally tend to reference memory addresses close to the prior memory reference addresses. This locality focuses on small sized memory allocations and de-allocations. Therefore, according to specific embodiments of the present invention, to improve the efficiency of memory allocations and de-allocations for object oriented runtime environments a co-design allocation/deallocation procedure is used, with at least two different allocation procedures employed for memory allocations, said procedures optimized to handle different types of allocations. For example, a hardware/software (or low-level software/other software) co-design can be used.

According to specific embodiments, the present invention is involved with methods and/or systems and/or devices that can be used together or independently for improved memory management in information systems. Thus, according to specific embodiments of the present invention, systems and/or methods of the invention can provide one or more of the following:

1. Different implementation methods for memory allocation in a computer system according to the storage size needed to be allocated and/or de-allocated. For example, a system and/or method according to specific embodiments of the present invention can include hardware only, hardware with software support, and software only memory allocation and/or deallocation mechanisms.

2. In a specific example embodiment, three distinct methods (with corresponding distinct designs) for storage allocation and de-allocation, according to the ranges of the requested allocation size or de-allocation size.

3. A Multi-bit Memory Allocation Prefix logic for small storage allocation and de-allocation.
4. Restricted use of methods in built in system calls (such as the malloc call in the C language family), such as only for mid-size (e.g., such as between about 256 bytes and 1k bytes) memory allocations and/or de-allocations.
5. A directory-driven cache to map a large storage addressing to a smaller storage addressing for large-size storage of the allocation and de-allocation, without the need to have the large storage address residing in the directory-driven cache, in whole or in part.

Thus, according to specific embodiments of the present invention, for small block sizes, relatively simple hardware (or software in specific embodiments) is used for memory allocations and de-allocations for fast operations; while for medium block sizes, traditional software methods (such as malloc and analogous software routines or system calls) are used.

In further embodiments, for larger block sizes, a constant block size similar to a page size in a contemporary computing system, a directory-mapped cache is used. This page size is selected according to specific embodiments of the present invention to handled the maximum expected object size in an object oriented environment. In part because of this, according to specific embodiments of the present invention, there is no need to store the physical page numbers in the translation cache. This approach increases large size memory allocation and de-allocation efficiency, and the performance can be greatly enhanced because of the elimination of address translation.

According to specific embodiments of the present invention, when a memory allocation request is received by the appropriate system components, depending on the block size of the request, hardware and/or software logic will choose among different ways to handle the request. In a specific embodiment, three different ways are used: small size requests are handled by a logic component referred to at times herein as a Memory Management Cache (MMC); medium size requests are handled by allocation logic, which is some embodiments may be standard system-provided memory management software, such as malloc; and large size requests are handled by treating the main memory as a large cache, which if missed, will be handled by software in a way that is analogous to a conventional page fault. This facilitates the identifying of the absence of the page in a main memory.

In particular implementations, because close to 100% of the allocation requests are of small sizes, the majority of allocation requests are handled by logic optimized for small size allocations (in specific embodiments, application specific integrated circuit components (ASICs) or other circuit hardware or optimized software routines) and thus the present invention provides for a very high efficiency in these memory allocations.

In an alternative specific embodiment, small size requests are handled by an executable component that can be downloaded from a remote site and installed on a client system as executable software and/or firmware. This software component performs the same functions as described herein under Memory Management Cache (MMC), but performs them using available hardware systems rather than custom hardware. Thus, as an example, an MMC can be an additional lower-level system software logic component installed during installation of an operating system (such as versions of Windows or Unix), or installed after installation of an operating system (such as using an operating system patch or upgrade) or installed during installation or upgrading of a runtime environment (such as Java). While such a software MMC may in some cases not provide as substantial a boost in memory allocation performance as a modified hardware component, it will still provide substantial improvements over current implementations. When used herein, MMC should be understood to encompass software and/or hardware and/or firmware implementations unless the context specifically requires otherwise. A software MMC can also make use of generalized computing resources provided to improve application execution, such as reserveable cache or high speed memory structures.

The invention according to specific embodiments can be used to improve performance in a range of information handling devices, such as Pocket PC (PPC), information aware communication devices such as digitally enabled television, cable or set-top boxes, or cellular phones, as well as a variety of familiar computing systems, from personal computers to servers and enterprise-level computers of any size.

The present invention can be incorporated at the memory management level of an information processing system. The invention thus can be embodied as a computer system including a CPU and other operating components. The invention can also be embodiment in a modified CPU and/or modified operating system and/or modified accessory components such as a memory management unit.

Memory Management Cache

According to specific embodiments of the present invention, a Memory Management Cache is a logical component (either hardware or software implemented) that can be understood generally to operate as a cache and that holds different bit-vectors for different memory regions. When an allocation request arrives, an MMC according to specific embodiments of the present invention will choose a region and lookup a free block for this request, mark the units occupied by this block and return a block reference to the caller. According to specific embodiments of the present invention, allocation requests generally go to the MMC, and the MMC determines whether it will handle the request or pass the request to a different available allocation routine.

Further Embodiments

Various embodiments of the present invention provide methods and/or systems for memory allocations in a runtime environment over a communications network. According to specific embodiments of the invention, a client system is provided with run-time code for a server system that allows the client to take advantage of one or more of the techniques according to specific embodiments of the invention. According to specific embodiments of the present invention, a client system is, or has previously been, provided with firmware and/or hardware that allows the client system to perform improved memory allocations.

Thus, in further embodiments, the present invention may be understood in the context of executable code that is distributed over a communication media. An important application for the present invention, and an independent embodiment, is in the field of providing executable code for enhanced memory allocation over the Internet, optionally using Internet media protocols and formats, such as HTTP, RTTP, XML, HTML, dHTML, VRML, Java, COM, Java beans, EXE, as well as supplemental image, audio, or video formats, etc. However, using the teachings provided herein, it will be understood by those of skill in the art that the methods and apparatus of the present invention could be advantageously used in other related situations where users access content over a communication channel, such as modem access systems, institution network systems, wireless systems, etc.

Software Implementations

Various embodiments of the present invention provide methods and/or systems for improved memory allocation that can be implemented on a general purpose or special purpose information handling appliance using a suitable programming language such as Java, C++, C#, Cobol, C, Pascal, Fortran., PL1, LISP, assembly, etc., and any suitable data or formatting specifications, such as HTML, XML, dHTML, TIFF, JPEG, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and subgoals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

Other Features & Benefits

The invention and various specific aspects and embodiments will be better understood with reference to the following drawings and detailed descriptions. For purposes of clarity, this discussion refers to devices, methods, and concepts in terms of specific examples. However, the invention and aspects thereof may have applications to a variety of types of devices and systems. It is therefore intended that the invention not be limited except as provided in the attached claims and equivalents.

Furthermore, it is well known in the art that logic systems and methods such as described herein can include a variety of different components and different functions in a modular fashion. Different embodiments of the invention can include different mixtures of elements and functions and may group various functions as parts of various elements. For purposes of clarity, the invention is described in terms of systems that include many different innovative components and innovative combinations of innovative components and known components. No inference should be taken to limit the invention to combinations containing all of the innovative components listed in any illustrative embodiment in this specification.

In some of the drawings and detailed descriptions below, the present invention is described in terms of the important independent embodiment of a system operating on a digital data network. This should not be taken to limit the invention, which, using the teachings provided herein, can be applied to other situations, such as cable television networks, wireless networks, etc. Furthermore, in some aspects, the present invention is described in terms of client/server systems. A number of computing systems and computing architectures are described in the art as client/server art. For the purposes of this description, client/server should be understood to include any architecture or configuration wherein an element acting as a client accesses a remote and/or separate program or device that is providing the desired service or executable code or environment (e.g., a server).

All references, publications, patents, and patent applications cited herein are hereby incorporated by reference in their entirety for all purposes.

BRIEF DESCRIPTION OF THE DRAWINGS

FIG. 11 illustrates an example of the organization of virtual addressing according to specific embodiments of the invention;

FIG. 12 illustrates an example of a page table entry according to specific embodiments of the invention;

FIG. 13 illustrates an example of flags in a page table entry according to specific embodiments of the invention;

FIG. 14 illustrates an example of the organization of the Page Allocator Cache, where t=virtual address size (64 bits)–$LOG_2$ (page size (256 KB)) and m=physical address size–$LOG_2$ (page size (256 KB)) according to specific embodiments of the invention;

FIG. 15 illustrates an example of a Page Allocator Cache for virtual storage size of $2^{64}$ bytes, physical storage size of 4 GB, and page size of 256 KB according to specific embodiments of the invention.

DETAILED DESCRIPTION OF SPECIFIC EMBODIMENT

Figure 1:
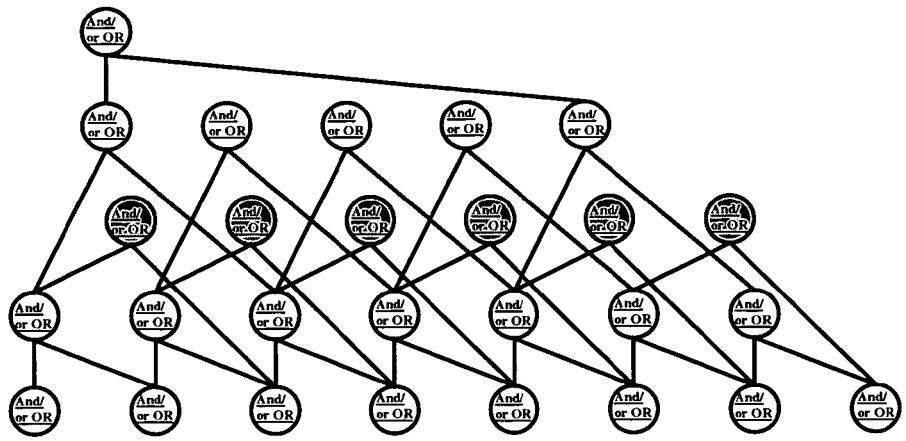
FIG. 1 illustrates a tree structure that is a combination of an and-gate tree and an or-gate tree with "bit-flippers" logic discussed by Chang for handling memory allocation and de-allocation requests.
Figure 2:
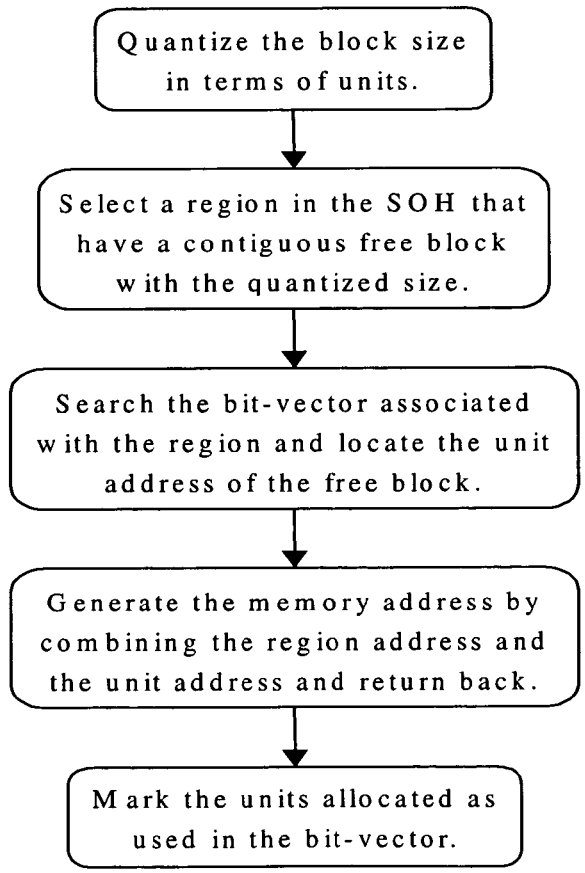
FIG. 2 illustrates a tree structure discussed by Cam for handling memory allocation and de-allocation requests.

While the invention is susceptible to various configurations and alternative forms, specific embodiments are shown by way of example in the drawings and will be described in details. It should be understood that the drawings and detailed description are not intended to limit the invention to the particular form disclosed, but to cover all modifications, equivalents and alternatives failing within the spirit and scope of the present invention as defined by the appended claims.

Thus, according to specific embodiments of the present invention, allocation requests are classified into multiple types. In a specific embodiment, there are three different types: small size, medium size, and large size. In other embodiments, it is possible to use other numbers of types, such as two, four, or five. However, this discussion will use a three type system for explanation purposes. The boundary of different types of requests can be modified or tuned depending on the statistics information of applications and the hardware configuration or depending on any other design criteria. Such tuning can be dynamic and change during runtime in particular systems or can be a fixed characteristic of a particular system or a particular run-time instance.

Small size allocation requests, which cover a very high percentage of the overall allocation requests, are handled by hardware logic (or, in alternative embodiments firmware or software logic) to maximize the performance. Medium size allocation requests have block sizes larger than those in the small size requests, and are handled by software to provide best resource utilization. Large size allocation requests are handled so that some fragments of the block reside in main memory and some fragments reside in the secondary storage. In this way, the main memory behaves in a way similar to a large cache and contains only a portion of the whole block allocated.

According to specific embodiments of the present invention, this classification process is implemented by a classification logic routine that detects in which range the size resides and triggers the appropriate process. This classification logic routing can be implemented in hardware and/or software and/or firmware in specific embodiments. If an allocation request is classified as a small size, the block size will be passed to the small size allocation logic and generate a block reference. If an allocation request is classified as medium or large size, a software trap occurs and control is passed to the appropriate logic routine to handle the request.

As one specific example for discussion purposes, small size allocation requests have block sizes less than about 1024 bytes; medium size allocation requests have block sizes greater than or equal to about 1024 bytes and less than about 64K bytes; and large size allocation requests have block sizes greater than or equal to about 64K bytes.

De-allocation requests use the same classification and other information assigned during the allocation process and generally use the same logic component or a closely cooperating logic component to do a reverse operation to free up the memory units. According to specific embodiments of the present invention, during allocation, an object reference is generated which can include an address and a classification. During deallocation, the object reference is used again and the classification is extracted from the object reference.

Small Size Allocation and De-allocation

Figures 7, 8, 9, 10:
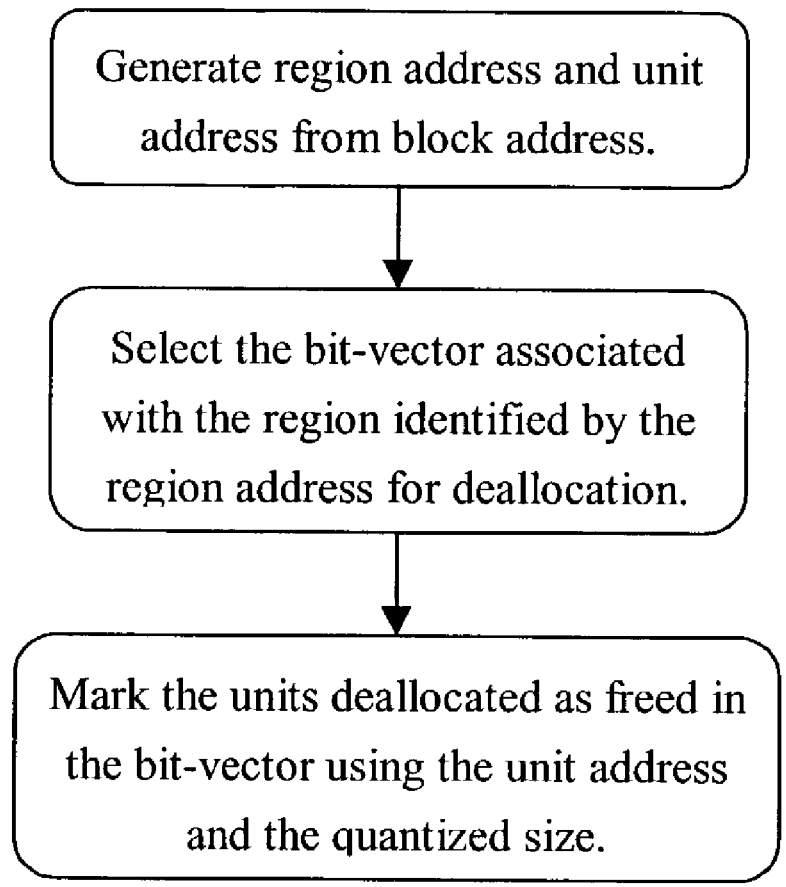
FIG. 7 illustrates a flow chart of an algorithm to de-allocate a small size block from the Small Object Heap (SOH) according to specific embodiments of the invention.
FIG. 8 illustrates an example of how the physical address is partitioned into a region address and a region offset according to specific embodiments of the invention.
FIG. 9 illustrates an example of a region offset is partitioned into a unit address and a unit offset according to specific embodiments of the invention.
FIG. 10 illustrates an example of a block reference is partitioned into a "size info" and a block address according to specific embodiments of the invention.

To provide effective memory management according to specific embodiments of the present invention, a main memory is divided into fixed sized regions and the memory address according to specific embodiments of the present invention can be understood as divided into a region address and a region offset, an example of which is shown in FIG. 8. According to specific embodiments of the present invention, the region address is used to identify a region of memory; while the region offset is used to address any locations within a region.

Small Object Heap

Figure 3:
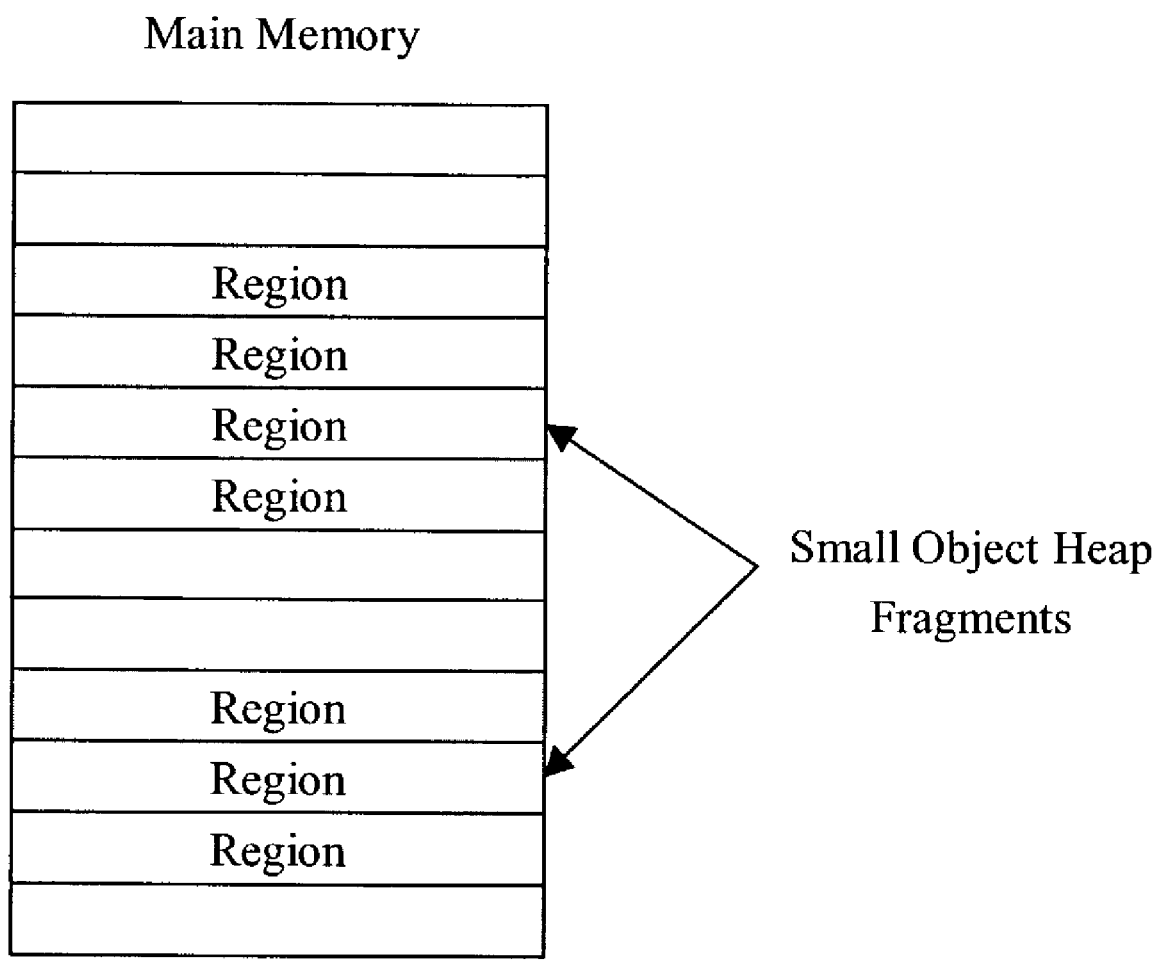
FIG. 3 illustrates an example of the memory organization of the Small Object Heap (SOH) in memory according to specific embodiments of the invention.

According to specific embodiments of the present invention, a Small Object Heap (SOH) is a collection of regions partitioned from the main memory and used in allocating small blocks. According to specific embodiments of the present invention, the SOH is not required to be contiguous, but can be built up by many fragments such that each fragment is a contiguous set of regions, an example of which is illustrated in FIG. 3. This SOH is generally maintained by the operating system or other run-time system and according to specific embodiments of the present invention the overall size can be dynamically enlarged or shrunk according to the demands of small size allocation requests.

According to specific embodiments of the present invention, each region in the Small Object Heap (SOH) has a region bit-vector associated with it, which records the used/freed information of memory units within a region. Each memory unit is the minimum distinctive entity for memory management under the allocation/deallocation scheme of the invention. The size of a memory unit is settable according to specific embodiments of the present invention and specific implementations, but generally should be selected to be somewhat smaller than the size of a region, but it generally should not be too small (e.g., 1 byte) otherwise memory management may be less effective. In this way, the region offset is divided into a unit address and a unit offset, an example of which is illustrated in FIG. 9. The unit address is used to address each unit within a region; while the unit offset is used to address each location within a memory unit. The size of the region bit-vector can generally be shown by the formula:

$$\text{region bit-vector length} = 2^{length\ of\ unit\ address}\ \text{bits.}$$

Quantization

Figure 6:
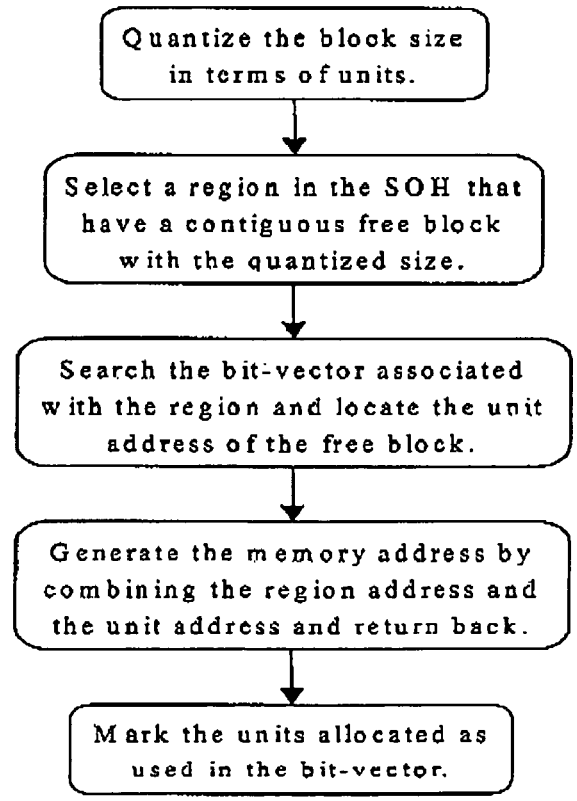
FIG. 6 illustrates a flow chart of an example algorithm to allocate a small size block from the Small Object Heap (SOH) according to specific embodiments of the invention.

According to specific embodiments of the present invention, when a small size allocation request arrives, the size of the request is quantized into a number of memory units. Then, a region (which can be determined by a decision tree as discussed below) in the (SOH) is selected for handling the request and a search is conducted on the bit-vector associated with this region to find out the first contiguous block of units with the quantized size. The unit address of the block is generated and combined with the region address to form the memory address. The memory address of the block is returned to fulfill the request and the allocated units are marked as used in the bit-vector. FIG. 6 provides a flow chart illustrating an example embodiment of this process.

When a small size de-allocation request arrives, the process is reversed. First the block address is sliced to produce a region address and a unit address. Then the region address is used to determine in which region the block resides. Using the unit address and the quantized size of the block, deallocated units are marked as freed in the bit-vector. FIG. 7 provides a flow chart illustrating an example embodiment of this process.

Memory Management Cache (MMC)

According to specific embodiments of the present invention, to speed up this process, a hardware and/or firmware and/or low-level software structure referred to as the Memory Management Cache (MMC) is used. In specific embodiments, this allows an allocation or de-allocation request to take only 1 cycle and/or a few pipeline stages to process in various implementations of the invention. The MMC includes a fast storage 3a that holds the information of a subset of regions within the SOH.

Figure 4:
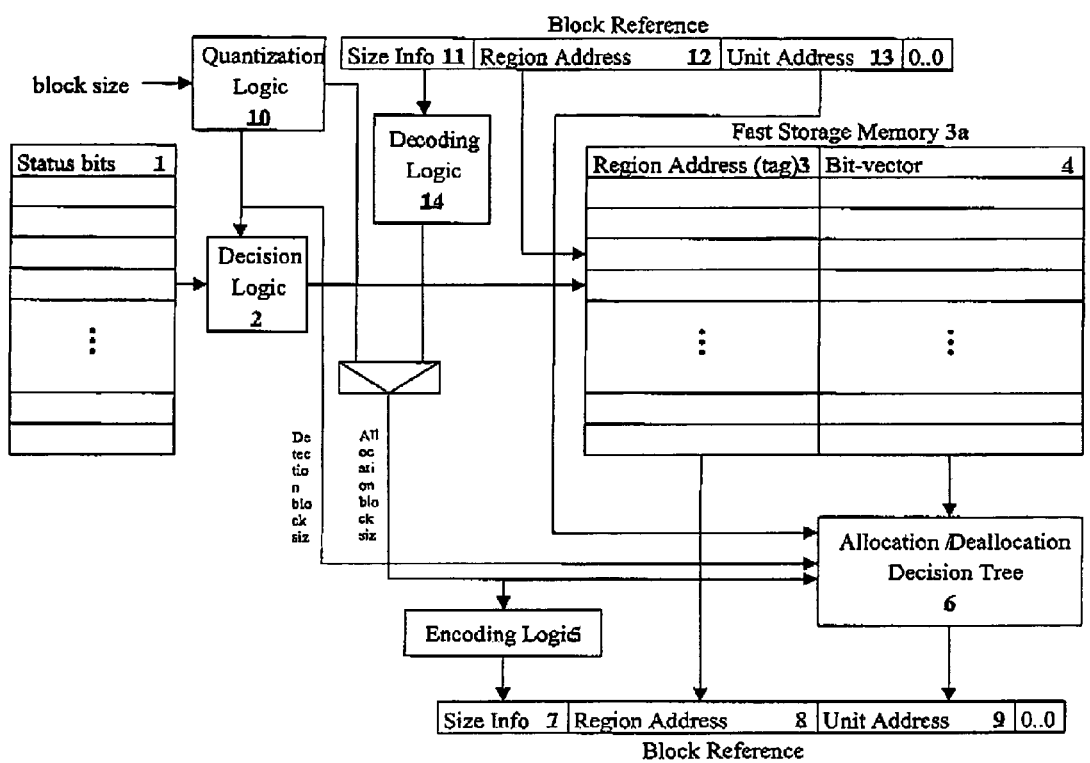
FIG. 4 illustrates an example of the logic structure and functions of a memory management cache according to specific embodiments of the invention that is used to cache the bit-vector that records the free/used information of each memory region.

FIG. 4 illustrates an example block diagram including an MMC according to specific embodiments of the present invention. Each cache line represents a region and consists of three parts: Region Address 3, Bit-vector 4, and status bit 1. The region address 3 defines which region this cache line is representing and is used to match with the region address provided by a de-allocation request to select appropriate cache line for de-allocation. The bit-vector 4 stores the used/freed information associated with the region. The status bits 1 stores information that helps to select an appropriate region for handling an allocation request. It consists of the Most Recently De-allocated (MRD) information, the Most Recently Allocated (MRA) information and the information whether the region has any free blocks of each of the detectable sizes given by the allocation/de-allocation decision tree 6.

The Decision Tree Logic 2 is used to select which region for allocation. It uses the information provided by the status bits 1 of all cache lines and the block size of the allocation request to make the decision. The allocation/de-allocation decision tree 6 is responsible for locating free blocks, marking the bit vector, generating the region offset 9 and updating the status bits 1.

Decision Tree Logic

According to specific embodiments of the present invention, various known decision trees can be used as the allocation/de-allocation decision tree 6, such as but not limited to those discussed in Chang or Cam. However, according to further embodiments of the present invention, a novel and more powerful decision tree is used for more effective free blocks detection. The decision trees introduced by Chang and Cam, for example, can only detect free blocks of sizes in the power of 2 units. The block size of an allocation request should be quantized to one of these detectable sizes for free block detection.

Example Allocation Process

When a small size allocation request arrives, the block size will be quantized into 2 different sizes using the quantization logic 10: the detection block size and the allocation block size. The detection block size is used by the detection logic 2 for cache line selection and the allocation/de-allocation decision tree 6 for free block lookup; while the allocation block size is used by the encoding logic 5 and the allocation/de-allocation decision tree 6 for marking bit-vector 4. The allocation block size is generated by quantizing the block size in terms of memory units; while the block detection size is generated by quantizing the block allocation size into one of the detectable sizes of the allocation/de-allocation decision tree 6.

After quantization of sizes, the detection block size will be passed in the decision logic 2, and it will suggest a region for handling the allocation request using the status bits 1 of all cache lines. As the status bits 1 already contain information if any free blocks can be detected with a given detection block size, the region selected guarantees a free block with given size can be detected.

After a cache line is selected, the bit-vector will be passed to the allocation/de-allocation decision tree 6 along with the detection block size and allocation block size. The decision tree 6 locates the free block and generates its unit address 9, which is then combined with a unit offset with zero value to produce the region offset. Then the units allocated are marked used by consulting the unit address and the allocation block size. Also a new copy of status bits 1 will be generated by the decision tree 6 and updates the old copy in the cache line.

Finally the allocation block size is encoded into a size info 7 and combined with the region address 8, the unit address 9 and the zeroed unit offset to form a block reference, see FIG. 10. If a region cannot be found in the very beginning for allocation, the control will be passed to the operating system to kick out some cache lines and bring in some new lines.

Example De-allocation Process

When a small size de-allocation request arrives, the block reference will be split up into a size info 11, a region address 12, an unit address 13, and a zeroed unit offset. Then, the size info will be passed into the decoding logic 14 and produce the allocation block size. The region address 12 will be used to match all the region addresses 3 of the cache lines. If a miss occurs, the control will be passed to the operating system and kick out a cache line and bring in the required line. If a hit occurs, the de-allocation process continues. First the hit cache line is enabled and the bit-vector 4 will be passed to the allocation/de-allocation decision tree 6. With the bit-vector 4, the allocation block size, and the unit address 13, the decision tree will mark the units de-allocated as freed in the bit vector. Also, a new copy of status bits 1 will be generated by the decision tree 6 and updates the old copy in the cache line.

Multi-bit Memory Allocation Prefix Circuit

An example decision tree according to specific embodiments of the invention assumes that the memory is divided into a number of units and each unit contains a fix number of bytes. The actual block size used during memory allocation is the size in multiples of the units and the smallest allocatable block size is one unit. For example, if a unit contains 16 bytes of memory and a memory allocation of size 24 bytes is requested, then the actual block size allocated will be 2 units, or 32 bytes.

To make a better search of free blocks, the invention can employ a novel design that is able to detect free blocks with more discrete sizes and not restricted to sizes of the power of 2. The way to do this is to group multiple bits in the size to address the level of the decision tree. If 2 bits are grouped at a time, the invention according to specific embodiments can detect the following discrete units:

1, 2, 3, 4, 8, 12, 16, 32, 48, 64

If 3 bits are grouped at a time, the invention according to specific embodiments can detect the following discrete units:

1, 2, 3, 4, 5, 6, 7, 8, 16, 24, 32, 40, 48, 56, 64

Figure 5:
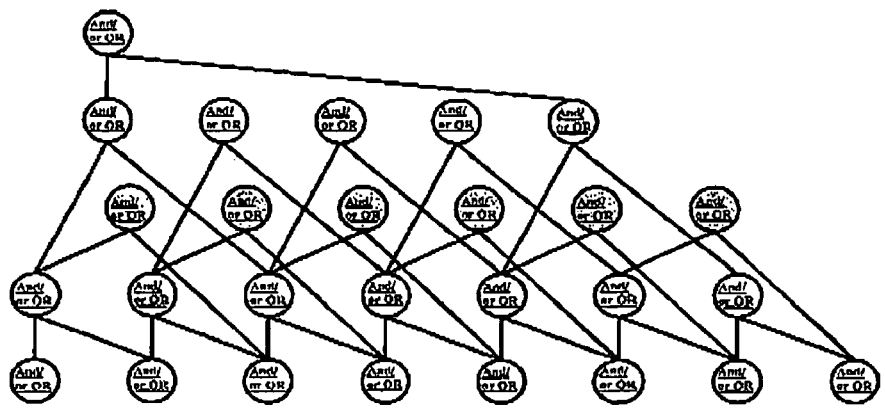
FIG. 5 illustrates an example tree structure according to specific embodiments of the invention that can lookup block with sizes other than powers of 2.

A referenced example implementation of the prefix circuit based on grouping 2 bits is shown in FIG. 5.

The algorithm for doing the allocation using a prefix circuit according to specific embodiments of the invention is described as follows:

1. Group the bits of the block size so that every two bits are a group.
2. Find out the most significant group with non-zero value. This group is called the key group. There is always only 1 key group.
3. Detect the groups which are less significant than the key group to see if all values are zero. If not, add 1 to the key group.
4. If the value of the key group changes to zero, add 1 to the group that is more significant than the key group and set that group as the new key group.

5. Use the position and the value of the key group to select the level in the allocation prefix circuit to do the allocation.

The following is an example to show how the steps are done:

| Unit size: | 16 bytes |
|---|---|
| Allocation Request: | A 52 bytes block |

Step 1: The size with bit grouping is shown as follows:

| Size in binary | | | | | | | |
|---|---|---|---|---|---|---|---|
| 00 | 00 | 00 | 00 | 00 | 11 | 01 | 00 |

Step 2: The key group is selected.

| Size in binary | | | | | | | |
|---|---|---|---|---|---|---|---|
| 00 | 00 | 00 | 00 | 00 | 11 | 01 | 00 |

Step 3: Since the groups that are lesser significant than the key group, therefore a '1' is added to the key group.

| Size in binary | | | | | | | |
|---|---|---|---|---|---|---|---|
| 00 | 00 | 00 | 00 | 00 | 00 | 01 | 00 |

Step 4: After adding the '1' the value of the key group becomes zero, the key group is reselected.

| Size in binary | | | | | | | |
|---|---|---|---|---|---|---|---|
| 00 | 00 | 00 | 00 | 01 | 00 | 01 | 00 |

Step 5: Since each group of two bits can have three valid values, each group of two bits corresponds to three levels of the prefix circuit. The results in the example show that the second least significant group is selected to be the key group.

| Size in binary | | | | | | | |
|---|---|---|---|---|---|---|---|
| | | | | | | Unit Offset | |
| 00 | 00 | 00 | 00 | 01 | 00 | 01 | 00 |

Referring to the allocation prefix circuit in FIG. 3, the level with size=4 units is used for allocation.

Medium Block Size Allocation and De-allocation

For medium block sizes, traditional software methods can be used to allocate the required block of memory from the physical memory heap. One implementation of these methods is the malloc call in C family languages. It is originally design to allocate a block of any size and return a reference to the caller, but when used according to specific embodiments of the invention it is only used for allocating medium block size allocations. In other embodiments, a further custom allocation routine could be used for medium sized allocations as would be understood in the art from the teachings herein.

Large Block Size Allocation and De-allocation

For large block sizes, main storage is divided into large blocks, such as, for example, pages of 256-KB each, but there is no need for virtual page number translation to physical page number in this scheme. This 256 KB page size, for example, represents the maximum size of an object in one implementation of Java. Generally, object oriented languages will define a maximum size of a single object and according to specific embodiments of the present invention a page size is selected so that one page can contain a maximum size object. However, the 256 KB page size can be adjusted in various embodiments and in an example embodiment may be dynamically adapted according to various powers of two.

This approach can be understood as different from conventional paging in that there is no address translation involved. In a specific example embodiment, a match requires the tag to be the same as the upper bits of the virtual page number of the virtual storage address, AND a p-code to indicate it is a VALID entry; otherwise it is a miss-match (or miss). A VALID entry indicates the page is in main storage. The index to the Page Allocator Cache is the physical page number for the address translation. Therefore there is no need for the actual translation. The physical address is the rightmost bits of the virtual storage address. FIG. 15 illustrates an example of how this data may be organized in specific systems.

The miss-match (or miss) of the look-up table indicates the page of storage is absent in physical memory, and transportation of the data in the lower-speed storage to the higher-speed storage (memory) is required.

Thus, large block allocation according to specific embodiments of the invention can be understood as treating main storage (memory) available during execution in a way similar to a big cache. The addressing space can be large, similar to conventional virtual addressing, but according to specific embodiments of the invention there is no need to have the addresses translated.

Thus, the invention according to specific embodiments makes use of the fact that in an object oriented programming environment there is no intrinsic requirement of contiguous addresses. In object oriented systems where there is a maximum limitation on each object, then the addressing of an object is within a single page. Thus, each page can have a distinct address and nothing to do with the objects. Thus the invention can map a large space to a small space without a translations and can avoid use of a translation lookaside buffer. The invention can use something similar but smaller, such as a bit for each virtual address saying that page is in memory or not in memory.

For situations where an object orientated language does not provide a maximum block size or where an allowed maximum object in a language is larger than a page size that it is desired to use for the large allocation procedure, the invention can use a fourth classification for very large blocks (for example, larger than 1.5 Megs) and use higher level software or revert back to a standard malloc routine for those very large allocations.

General Client/Server Methods

Figure 16:
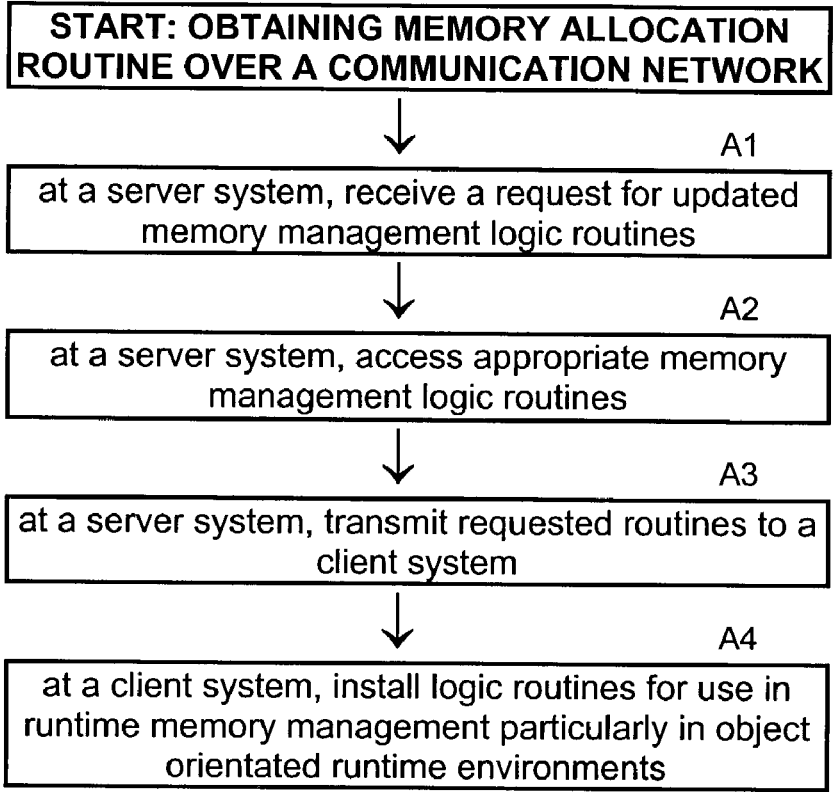
FIG. 16 is a flow diagram of a routine that enables a client system to access executable code for improved memory management according to specific embodiments of the present invention.

FIG. 16 is a flow diagram of a routine that enables a client system to access executable code for improved memory management according to specific embodiments of the present invention As will be further understood from the teachings provided herein, the present invention encompasses a variety of specific embodiments for performing these steps. The request for executable code may be received in a variety of ways, including through one or more graphical user interfaces provided by the server system to the client system or by the server system receiving an email or other digital message or communication from the client system. Thus, according to specific embodiments of the present invention, data and/or indications can be transmitted to the server using any method for transmitting digital data, including HTML communications, FTP communications, email communications, wireless communications, etc. In various embodiments, indications of desired data can be received from a human user selecting from a graphical interface at a computing device.

Embodiment in a Programmed Information Appliance

Figure 17:
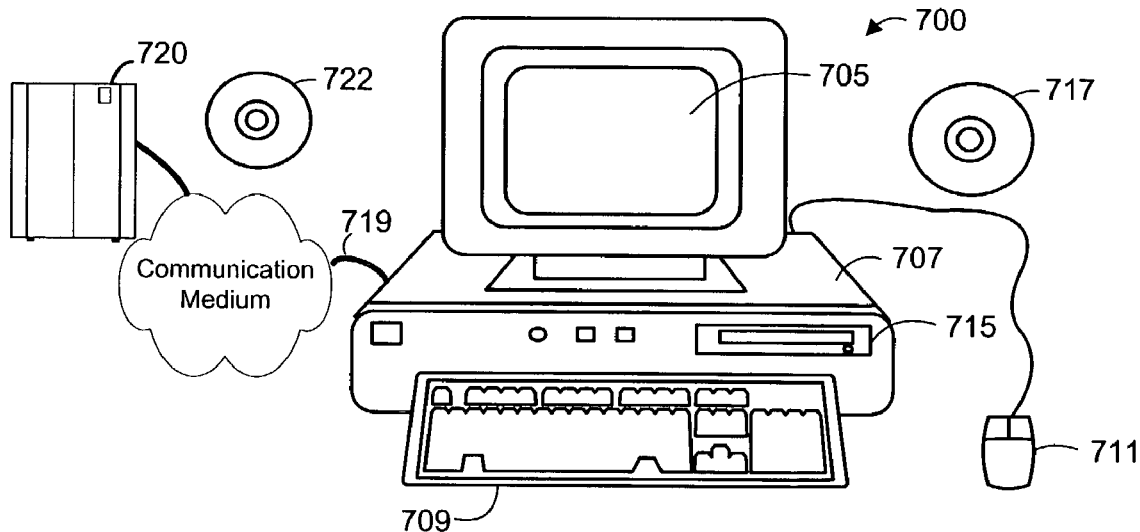
FIG. 17 is a block diagram showing a representative example logic device in which various aspects of the present invention may be embodied.

FIG. 17 is a block diagram showing a representative example logic device in which various aspects of the present invention may be embodied. As will be understood to practitioners in the art from the teachings provided herein, the invention can be implemented in hardware and/or software. In some embodiments of the invention, different aspects of the invention can be implemented in either client-side logic or server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media containing logic instructions may be delivered to a viewer on a fixed media for physically loading into a viewer's computer or a fixed media containing logic instructions may reside on a remote server that a viewer accesses through a communication medium in order to download a program component.

FIG. 17 shows an information appliance (or digital device) 700 that may be understood as a logical apparatus that can read instructions from media 717 and/or network port 719, which can optionally be connected to server 720 having fixed media 722. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717, or fixed media 722 over port 719, may be used to program such a system and may represent a disk-type optical or magnetic media, magnetic tape, solid state dynamic or static memory, etc. In specific embodiments, the invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language, which may be used to create an ASIC, or PLD that operates as herein described.

Other Embodiments

The invention has now been described with reference to specific embodiments. Other embodiments will be apparent to those of skill in the art. In particular, a viewer digital information appliance has generally been illustrated as a personal computer. However, the digital computing device is meant to be any information appliance for interacting with a remote data application, and could include such devices as a digitally enabled television, cell phone, personal digital assistant, laboratory or manufacturing equipment, etc. It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety.

What is claimed:

1. A method of allocating memory in an information processing system comprising:
   determining a characteristic of an allocation request;
   selecting, from said characteristic, one of two or more distinct allocation logic procedures for performing a memory allocation;
   performing said memory allocation using a selected logic procedures;
   wherein one of said two or more distinct allocation logic procedures is a proceduer for allocating a small memory block comprising:
   quantizing the block size into a number of units;
   select a region in a reserved memory area with a contiguous free block of the quantized size;
   searching a bit-vector associated with said selected region to locate a unit address of the free block;
   generating a memory address by combining a region address and a unit address;
   returning said memory address; and
   marking units allocated as used in the bit-vector.

2. The method according to claim 1 further comprising: deallocating said memory allocation according to said selected
   logic procedure when said memory allocation is no longer required.

3. The method according to claim 2 further comprising:
   storing, for said memory allocation, information enabling deallocation according to said selected logic procedure.

4. The method according to claim 1 wherein said determining characteristics further comprises:
   determining the amount of memory needed for said allocation request;
   determining one of two or more classifications for said allocation request in response to said amount.

5. The method according to claim 4 wherein said two or more classifications comprise three size classifications referred to as small, medium, and large.

6. The method according to claim 5 wherein said small classification is applied to memory allocations of less than about 1 K bytes.

7. The method according to claim 5 wherein said medium classification is applied to memory allocations of greater than about 1 K bytes and less than about 64 k bytes.

8. The method according to claim 5 wherein said large classification is applied to memory allocations of greater than about 64 k bytes.

9. The method according to claim 5 wherein:
a logic procedure for said large classifications effectively treats main memory as a large cache.

10. The method according to claim 5 wherein:
a logic procedure for said large classifications comprises virtual addressing for allocated pages but does not have to store a physical page number in a page allocator cache; and
in said logic procedure for said large classifications there is no need for address translation.

11. The method according to claim 10 wherein:
rightmost bits of an address value are treated as a physical address.

12. The method according to claim 1 wherein:
one of said distinct allocation logic procedures comprises a logic procedure for allocating small memory allocations.

13. The method according to claim 1 wherein:
one of said distinct allocation logic procedures comprises a logic procedure comprising a paging logic routine for handling large memory allocations in an object oriented run-time environment.

14. A computer readable medium containing computer interpretable instructions describing a circuit layout for an integrated circuit that, when constructed according to said instructions, will configure a circuit to perform the method of claim 1.

15. A computer readable medium containing computer interpretable instructions that when loaded into an information processing device will cause the device to operate in accordance with the method of claim 1.

16. A method of allocating a small memory block comprising:
quantizing the block size into a number of units;
select a region in a reserved memory area with a contiguous free block of the quantized size;
searching a bit-vector associated with said selected region to locate a unit address of the free block;
generating a memory address by combining a region address and a unit address;
returning said memory address; and
marking units allocated as used in the bit-vector.

17. A method of small size allocation and de-allocation comprising:
dividing a main memory into fixed sized regions;
dividing a memory address into a region address and a region offset;
wherein the region address is used to identify a region of memory;
wherein the region offset is used to address locations within a region;
partitioning a Small Object Heap (SOH) from main memory as a collection of regions to be used in allocating small blocks;
wherein said SOH is not required to be contiguous, but can be built up by many fragments such that each fragment is a contiguous set of regions;
wherein said SOH is maintained by a runtime operating environment and can be dynamically enlarged or shrunk;
wherein each region in the SOH has a region bit-vector associated with it;
wherein a region bit-vector records used or freed status information of memory units within a region;
wherein each memory unit is a minimum distinctive entity for memory management;
wherein the size of a memory unit is settable;
wherein the region offset is divided into a unit address and a unit offset;
wherein the unit address is used to address each unit within a region;
wherein the unit offset is used to address each byte within a memory unit; and
wherein when a small size allocation request arrives, a size of the request is quantized into a number of memory units;
selecting an available region in the SOH for handling the request;
searching the bit-vector associated with a region to find out the first contiguous block of units of the quantized size;
generating a unit address of the block;
combining said unit address with the region address to form the memory address;
returning the memory address of the block to fulfill an allocation request;
marking allocated units as used in the bit-vector;
further wherein when a small size de-allocation request arrives:
slicing a block address to produce a region address and a unit address;
using the region address is to determine in which region the block resides;
using the unit address and the quantized size of the block to mark deallocated units as freed in the bit-vector.

18. A memory management cache comprising:
a fast storage that holds information of a subset of regions within a memory area;
a plurality of cache lines, with a cache line representing a region and comprising a region address, a bit-vector, and one or more status bits;
wherein the region address defines which region this cache line is representing;
wherein the region address is used to match with a region address provided by a de-allocation request to select cache lines for de-allocation;
wherein the bit-vector stores used or freed information associated with the region;
wherein the status bits store information used to select an appropriate region for handling an allocation request;
further wherein the status bits information comprises most recently deallocated information, most recently allocated information and information whether the region has any free blocks of each of the detectable sizes given by an allocation and deallocation decision tree;
decision logic to select a region for allocation that uses information provided by the status bits of all cache lines and the block size of the allocation request to make the decision;
wherein said decision logic locates free blocks, marks the bit vector, generates the region offset and updates the status bits.

19. A small memory block allocation system comprising:
means for quantizing a block size into a number of units;
means for selecting a region in a reserved memory area with a contiguous free block of the quantized size;
means for searching a bit-vector associated with said selected region to locate a unit address of the free block;
means for generating a memory address by combining a region address and a unit address:
means for returning said memory address; and
means for marking units allocated as used in the bit-vector.

* * * * *